Patented Sept. 27, 1949

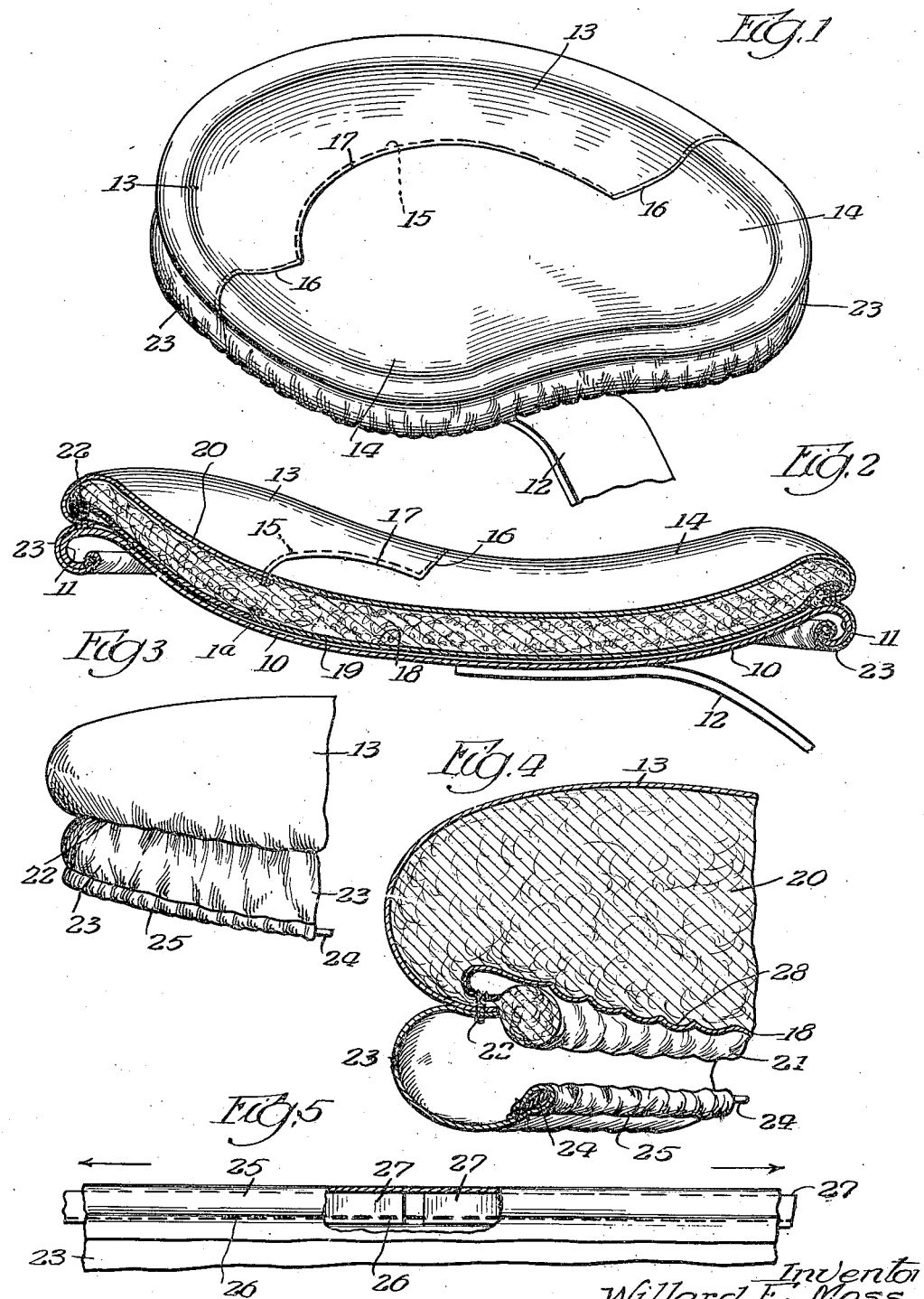

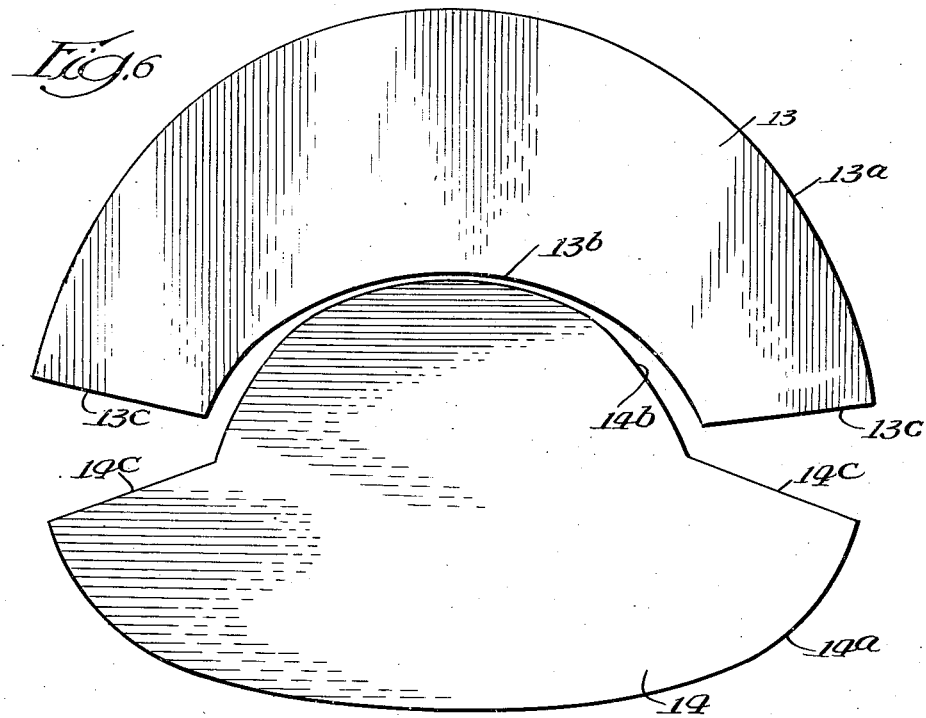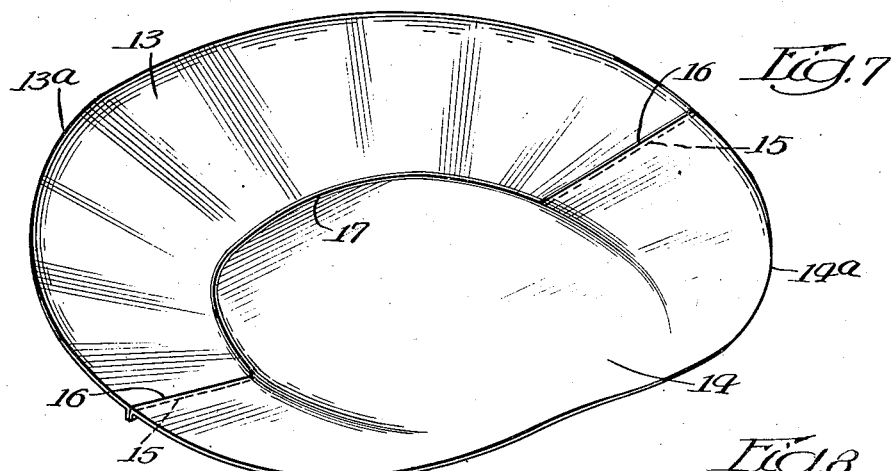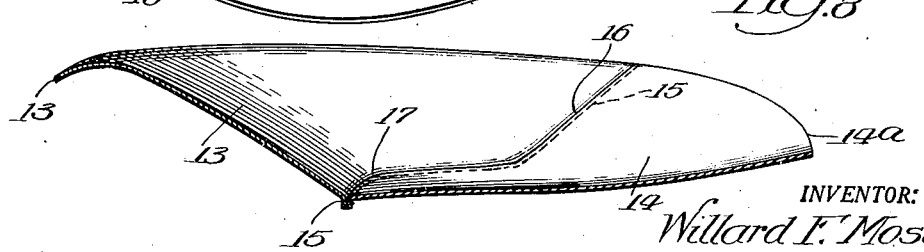

2,483,223

UNITED STATES PATENT OFFICE 2,483,223

TRACTOR SEAT COVER

Willard F. Moss, Chicago, Ill.

Application October 1, 1945, Serial No. 619,641

2 Claims. (Cl. 155—184)

This invention relates in general to a seat cushion and cover and is more particularly described in connection with a flat recessed vehicle seat for an agricultural implement, or the like, although it may have a more general use wherever applicable.

In tractors, harvesters and other agricultural implements, a hollow, flat seat is usually included, made of metal and frequently having a cover of leather, fabric or weather-proofing material. This cover is subject to wear, it usually is not padded to provide a soft or cushioned seat, and if left out in the open, the seat surface may be wet, cold and uncomfortable.

The present invention provides a removable padded seat cushion and cover for a recessed and hollowed seat in which the upper and lower covers are formed of pieces secured together to produce a bulging or fullness such that although the cover is tightly secured around the edges of the seat, the surplus material of the covers will fit downwardly into the recess at the back, downwardly recessed portion of the seat to fit closely and to follow the contour of the recessed portion thereof.

A further object of the invention is to provide a new and improved seat cushion construction having a flexible rim attached at one side thereof for yieldingly holding the cushion and cover upon the flange of a seat.

Still a further object of the invention is to provide an improved cushion having opposite cover pieces with a pad interposed between them and projecting at the marginal edge between the covers to hold the pad in place and with a resilient rim attached to one of the covers for bending the edge of the cushion outwardly in applying it to an implement seat.

Still a further object of the invention is to provide a seat cushion in which the opposite covers thereof are formed of a plurality of pieces and material for accommodating the cushion to a curved implement seat and for utilizing smaller pieces of materials in making the cushion.

A further object of the invention is to provide a seat cushion with a flexible resilient attaching rim which projects from the marginal edge thereof with resilient material, such as rubber, stitched in a gathered or shirred edge to provide substantially continuous resiliency without requiring a continuous resilient element in the rim.

A further object of the invention is to provide an improved simple construction whereby a seat cushion can be readily assembled by connecting the covers and a resilient attaching rim with a single line of stitching which also passes through the marginal edges of a padding holding all the parts in place.

Other objects of the invention will appear in the specification and will be apparent from the accompanying drawing forming a part thereof.

In the drawings:

Figure 1 is a perspective view of a seat cushion and cover in accordance with this invention as it appears when applied to a vehicle seat;

Figure 2 is a sectional view of the cushion and cover as applied to a seat in Figure 1;

Figure 3 is a fragmentary outside view of the cushion and cover before it is applied to a seat;

Figure 4 is an enlarged sectional detail showing the construction of the cushion and cover;

Figure 5 is a detail view illustrating a number of pieces of resilient material such as rubber stitched in the marginal edge of the flexible attaching rim to provide a resilient, shirred holding portion;

Figure 6 shows the shapes of two associated blanks of sheet material before they are stitched together to make one of the covers;

Figure 7 is a perspective view showing the blanks of Figure 6 stitched together to form a cover with a depression or fullness in accordance with the shapes of the blanks; and Figure 8 is a sectional view of the cover as shown in Figure 7.

An implement seat 10 of the hollow, recessed and rounded type, is shaped for comfort without a prominent front horn and has an outer rolled flange 11 to add strength and finish to the seat. It may be supported by a metal spring arm 12 or in any other suitable manner and may also be provided with a surface or coating (not shown) of fabric, plastic material or any other weather-proofing and protecting material. These seats may be made of metal and usually depend upon their recessed and hollowed shape for their comfort and do not provide any substantial cushioning surface.

The present invention provides a padded cushion to provide a comfortable implement seat of this type with marginal means for tightly holding the cushion in place, and at the same time providing covers which bulge or have sufficient fullness to follow and fit closely in the recesses or projections thereof.

This cushion comprises an upper cover composed of pieces 13 and 14 connected together by an irregular seam 15, the seam 15 extending across the recessed or projecting portions of the seat with angular side portions 16 and a rounded connecting portion 17 providing more fullness than at the other portions so that the material of the cover will conform readily to recesses, projections and the curved surfaces of the seat 10 without undue stretching of the parts 13 and 14 at the same time and making it possible to utilize pieces of smaller dimensions than would be necessary for the full diameter of the seat.

To form a cushion with additional fullness to fit a depression or to fit over a projection, one of the cover pieces as 13 may have an outer rounded edge 13a, an inner edge 13b of less curvature than the outer edge, and angular side portions 13c connecting the inner and outer curved portions. The complementary cover piece 14 has an outer curved edge 14a which may be somewhat flattened to fit the front of a vehicle seat, an inwardly rounded projection 14b of the same length as the inner curved edge 13b of the other piece, and with angular edges 14c connecting the outer edge 14a and the inner projection 14b. The lengths of the edges 13c and 14c are substantially the same so that when the pieces are placed together and in slightly overlapping relation and then stitched together as shown in Figure 7, the attachment of the central portions and the angular portions draws the pieces together at their outer edges forming a fullness or looseness at the center which is adapted to fit closely into a depression or recess, or to fit upwardly over a projection, depending upon the shapes of the pieces which, of course, may be varied to fit any particular seat.

A lower or bottom cover 18 usually of lighter water-proof material than the upper cover, and of the same size thereof, is formed in two pieces connected together by a seam 19 turned inwardly and of the same shape as the attached portions in the cover, and both of the covers being of the same outer dimensions and extent. Between the two covers, a pad 20 of fibrous or flexible cushioning material is inserted, a thin portion 21 of the padding protruding or extending outwardly from between the covers at the edges when they are connected together by marginal stitching 22 so that the padding is held firmly in place by the stitching.

A marginal rim 23 of flexible material is also stitched to the outside of the outer cover member 13 and extends inwardly from the edge thereof when the upper and lower covers are arranged flatly for applying the stitching 22. In the outer edge of the rim 23, a strip 24 of resilient material such as rubber is stitched in a hem 25, the resilient material being stretched or extended when stitched in place when stitches 26 are applied so that when released the hem 25 will be gathered or shirred, materially shortening the inner edge of the rim. This resilient material 24 need not be a continuous rim but may consist of a number of pieces 27 of resilient material attached in place by the stitching 26 so that it is therefore more easily applied and does not require a continuous rubber ring to produce the shirred resilient attaching effect. The resilient rim causes the cushion to be drawn inwardly about the edge and because the lower cover or lining 18 is usually of thinner material, the outer cover may be upset inwardly as shown in Figure 4 roughening or ruffling the inner cover or lining 18 and producing an uneven surface 28 as represented in exaggerated form in Figure 4. The cover is reversible on the seat 10, that is, it may be placed thereon with either side uppermost. If it is desired to avoid the ruffling at 28 entirely, this may be accomplished by making the pieces of the bottom surface 19 very slightly smaller than the sizes of the corresponding top pieces 13 to 14.

When the cushion and cover are applied to the flange 11 of a seat 10, the rim 23 is extended under the flange 11 of the seat causing the seat cover to be rounded upwardly and outwardly at the upper side of the seat with the protruding rim portion 21 of the pad seated inwardly of the marginal edge and accentuating the raising of the rim portion of the cover at the edge of the seat. The rim and outer cover both extend outwardly from the marginal stitching 22 which connects them, thereby providing a finished outer seam at the lower edge of the seat cushion.

This forms a rounded seat cushion and cover for the seat which is of substantially the same shape and form as the seat itself. If this cushion did not have the additional fullness provided by the rounded portion 17 and the side portions 16 of the seam 15, the inner portion would not fit into the recess of the seat, but would be drawn tightly across the plane formed by the outer marginal rim by the resilient marginal rim. This same fullness may also be provided to fit over a projection in the seat such as a horn or pommel.

A cover is thus formed for the seat protecting it from the weather and also a cushion which conforms to the surface of the seat and forms a marginally strengthened and supported edge which accentuates the edge of the seat and provides an additional retaining edge for the covered seat.

With this construction an efficient seat cushion and cover is quickly and easily made by simultaneously joining the covers, pad and the fastening rim at the same time, thereby securely binding all of the parts together and in their proper positions.

Although a preferred embodiment of the invention is thus shown and described for application to a relatively flat type of implement seat, it is to be understood that this cushion may have a more general application and use and is not limited to the precise construction as shown which is merely illustrative of the principles of the invention.

What I consider new and desire to secure is:

1. A cushion for a concave implement seat, comprising a pad, covers for opposite sides thereof, an attaching rim, and a single line of stitching connecting them all together, said attaching rim having a resilient edge, the outer cover comprising separate pieces with interfitting curved recessed and projecting portions of different curvatures at the central portion of the cushion and each terminating in straight portions extending from the curved portions to the periphery of the cushion, said interfitting portions and adjacent straight portions being stitched together to provide a fullness inwardly of the edge to fit concave seat portions, to extend over the concave portion of a seat to which it is applied.

2. A cushion for a recessed implement seat comprising a pad, covers for opposite sides thereof, each of the covers having two complementary pieces, one with a rounded projection and the other with a recess shallower than the projection but with an edge of the same length as the edge of the projection and opposite straight edges extending angularly apart from the ends of the recess and projection and of the same length, the said edges being stitched together to provide fullness inwardly from the periphery thereof, and the two covers being stitched together along their perimeters to form a single cover for both sides of the pad.

WILLARD F. MOSS.

REFERENCES CITED

The following references are of record in the file of this patent:

UNITED STATES PATENTS

| Number | Name | Date |
|---|---|---|
| 202,925 | Brown | Apr. 30, 1878 |
| 1,322,959 | Sawasaki | Nov. 25, 1919 |
| 1,418,940 | Kutschmar | June 6, 1922 |
| 1,467,878 | Rimpler et al. | Sept. 11, 1923 |
| 1,495,665 | Bigelow et al. | May 27, 1924 |
| 1,590,629 | Julius | June 29, 1926 |
| 1,803,029 | Mesinger | Apr. 28, 1931 |
| 1,991,751 | Kennedy | Feb. 19, 1935 |
| 2,183,828 | Trubitz | Dec. 19, 1939 |
| 2,191,956 | Coldren | Feb. 27, 1940 |
| 2,195,039 | Shauer | Mar. 26, 1940 |
| 2,257,848 | Larkin | Oct. 7, 1941 |
| 2,367,450 | Trubitz | Jan. 16, 1945 |